(12) United States Patent
Hu et al.

(10) Patent No.: US 10,469,277 B2
(45) Date of Patent: Nov. 5, 2019

(54) MULTICAST GROUP ESTABLISHMENT METHOD IN FAT-TREE NETWORK, APPARATUS, AND FAT-TREE NETWORK

(71) Applicant: Huawei Technologies Co., Ltd., Shenzhen (CN)

(72) Inventors: Bing Hu, Hangzhou (CN); Kwan Lawrence Yeung, Hong Kong (CN); Lei Cui, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 202 days.

(21) Appl. No.: 15/637,705

(22) Filed: Jun. 29, 2017

(65) Prior Publication Data

US 2017/0302464 A1 Oct. 19, 2017

Related U.S. Application Data

(63) Continuation of application No. PCT/CN2015/099163, filed on Dec. 28, 2015.

(30) Foreign Application Priority Data

Dec. 31, 2014 (CN) .......................... 2014 1 0855950

(51) Int. Cl.
*H04L 12/18* (2006.01)
*H04L 12/761* (2013.01)
(Continued)

(52) U.S. Cl.
CPC ...... *H04L 12/185* (2013.01); *H04L 29/06027* (2013.01); *H04L 45/16* (2013.01);
(Continued)

(58) Field of Classification Search
CPC ....... H04L 12/185; H04L 45/16; H04L 45/48; H04L 47/15; H04L 49/15; H04L 29/06027; G06F 21/10
See application file for complete search history.

(56) References Cited

U.S. PATENT DOCUMENTS 5,331,637 A 7/1994 Francis et al.
8,706,897 B2 4/2014 Wadhwa et al.
(Continued)

FOREIGN PATENT DOCUMENTS

CN 101631129 A 1/2010
CN 101702689 A 5/2010
(Continued)

OTHER PUBLICATIONS

Zhou et al., "Hardware supported multicast in fat-tree-based InfiniBand networks," The Journal of Supercomputing vol. 40, No. 3, pp. 333-352, XP019508729, Springer (Mar. 16, 2007).
(Continued)

*Primary Examiner* — Paul H Masur
(74) *Attorney, Agent, or Firm* — Leydig, Voit & Mayer, Ltd.

(57) ABSTRACT

A multicast group establishment method in a fat-tree network is disclosed, the method includes: sending, by a network node according to an address of a target multicast group, a join request to a management switching node of the target multicast group, where the join request is used to request to make the network node join the target multicast group, and the management switching node of the target multicast group is a core switching node to which the address of the target multicast group belongs. The fat-tree network includes multiple switching nodes, a top layer is a core switching node, and each core switching node manages multiple multicast group addresses.

15 Claims, 3 Drawing Sheets

(51) Int. Cl.
*H04L 12/933* (2013.01)
*H04L 12/753* (2013.01)
*H04L 29/06* (2006.01)
*G06F 21/10* (2013.01)
*H04L 12/801* (2013.01)

(52) U.S. Cl.
CPC .............. *G06F 21/10* (2013.01); *H04L 45/48* (2013.01); *H04L 47/15* (2013.01); *H04L 49/15* (2013.01)

(56) References Cited

U.S. PATENT DOCUMENTS

| | | | |
|---|---|---|---|
| 2013/0259042 A1 | 10/2013 | Song et al. | |
| 2013/0329727 A1* | 12/2013 | Rajagopalan | H04L 12/4641 370/390 |
| 2014/0369345 A1* | 12/2014 | Yang | H04L 12/18 370/355 |
| 2015/0181317 A1* | 6/2015 | Yin | H04Q 11/0062 398/45 |
| 2015/0304117 A1* | 10/2015 | Dong | H04L 12/185 370/312 |
| 2016/0134513 A1* | 5/2016 | Yang | H04L 45/16 370/390 |

FOREIGN PATENT DOCUMENTS

| | | |
|---|---|---|
| CN | 101800701 A | 8/2010 |
| CN | 102075439 A | 5/2011 |
| CN | 102647333 A | 8/2012 |
| CN | 104518891 A | 4/2015 |

OTHER PUBLICATIONS

Birrer et al., "FatNemo: Building a Resilient Multi-source Multicast Fat-Tree," . WCW 2004, XP055427959, pp. 182-196, LNCS3293 (2004).

Guo et al.,"On-Line Multicast Scheduling with Bounded Congestion in Fat-Tree Data Center Networks," IEEE Journal on Selected Areas in Communications, vol. 32, No. 1, pp. 102-115, Institute of Electrical and Electronics Engineers, New York, New York (Jan. 2014).

Li et al.,"ESM: Efficient and Scalable Data Center Multicast Routing," IEEE/ACM Transactions on Networking, vol. 20, No. 3, pp. 944-955, Institute of Electrical and Electronics Engineers, New York, New York (Jun. 2012).

Guo et al.,"On Nonblocking Multirate Multicast Fat-tree Data Center Networks with Server Redundancy," 2012 IEEE 26th International Parallel and Distributed Processing Symposium, pp. 1034-1044, Institute of Electrical and Electronics Engineers, New York, New York (2012).

Li et al.,"Scalable Data Center Multicast using Multi-class Bloom Filter," 2011 19th IEEE International Conference on Network Protocols, pp. 266-275, Institute of Electrical and Electronics Engineers, New York, New York (2011).

* cited by examiner

MULTICAST GROUP ESTABLISHMENT METHOD IN FAT-TREE NETWORK, APPARATUS, AND FAT-TREE NETWORK

CROSS-REFERENCE TO RELATED APPLICATIONS

This application is a continuation of International Application No. PCT/CN2015/099163, filed on Dec. 28, 2015, which claims priority to Chinese Patent Application No. 201410855950.2, filed on Dec. 31, 2014. The disclosures of the aforementioned applications are hereby incorporated by reference in their entireties.

TECHNICAL FIELD

The present disclosure relates to communications technologies, and in particular, to a multicast group establishment method in a fat-tree network, an apparatus, and a fat-tree network.

BACKGROUND

At present, a topology structure commonly used by a data center is a fat-tree (Fat-Tree) structure. In a fat-tree-based interconnection network, a leaf node represents a processor or a server, an internal node is a switch or a switching chip, and each line corresponds to a two-way link between upper-layer and lower-layer nodes. A route in a fat-tree totally includes two stages: a rise stage and a fall stage. For example, assuming that a leaf node processor i sends a data packet to a processor j, at the rise stage, the data packet rises along the fat-tree by using an internal switch/switching chip until reaching a common "ancestor" of the processor i and the processor j, where there may be more than one common "ancestor"; then, at the fall stage, the data packet is sent downward to the processor j by using the internal switch/switching chip.

It should be noted that, for a network including N nodes, having characteristics of total bandwidth bisection specifically refers to that the N nodes are arbitrarily divided into two parts, and provided that each part includes N/2 nodes, a sum of link bandwidth between the two parts is N/2 times of bandwidth of a single link. Therefore, the two parts may communicate with each other at full speed. If the total bandwidth bisection cannot be ensured, no route can be used for measurement to ensure that there is no congestion. Therefore, to enable the fat-tree to ensure the bandwidth bisection, the fat-tree has a strict limitation to a quantity of switches or switching chips at each layer. For example, assuming that in a fat-tree network, a quantity of ports of each switch or switching chip is 2n, a quantity of pods is 2n, in each pod, a quantity of access switches or switching chips is n, a quantity of aggregation switches or switching chips is also n, a quantity of processors or servers is $n^2$, and in addition, a quantity of core switches or switching chips is $n^2$. To ensure load balancing in the fat-tree network in the example, $5n^2$ switches or switching chips are needed to associate $2n^3$ processors or servers without congestion. Load balancing is performed on data from an access switch or switching chip to a core switch or switching chip (uplink), and then, the data is returned from the core switch or switching chip to the access switch or switching chip, so as to ensure 100% throughput of the entire network. This manner is easy to implement for unicast scheduling, but is difficult to implement for multicast scheduling.

In the prior art, in a multicast solution of a fat-tree network, a bounded congestion multicast scheduling (BCMS) algorithm is mainly used. The BCMS algorithm is a centralized algorithm, and controls a main frame of a data center mainly by using open-flow (Open-Flow). In the BCMS algorithm, a central scheduler collects a bandwidth requirement of traffic of a mobile phone, monitors a network situation of the data center, that is, current available bandwidth of a network link, calculates a routing path of each flow, and configures a switch. A main feature of the BCMS algorithm is that it may ensure that a congestion degree of any link in a fat-tree network is bounded. Specifically, it may be defined that under a capacity-admissible data source, the BCMS algorithm makes a maximum congestion degree of any link in a fat-tree network be C, and a value of C depends on values of m, n, r, and s of the fat-tree network, where m is a quantity of core switches at a top layer, r is a quantity of edge switches at a bottom layer, n is a quantity of terminals connected to each edge switch, and s is link bandwidth of a core switch. That is, for a given fat-tree network, C is determined, and the value is determined. In the fat-tree network, each multicast traffic must pass through an uplink of a routing switch to reach the core switch. Therefore, a first step of the BCMS algorithm is to: determine an uplink of a multicast edge switch, and set an applicable core switch. After being sent to the core switch in a multicast manner, a multicast stream may be forwarded to all destination edge switches through a downlink. Then, a second step is to iteratively find an appropriate subset of the core switch, and to send downlink data by traversing each port in the subset in the multicast manner. Specifically, the appropriate subset of the core switch may be selected by using a greedy policy of a minimum cardinality.

However, if the BCMS algorithm in the prior art is used, each step of the multicast scheduling based on the fat-tree network needs global information, and then, global calculation is performed, resulting in a single point failure and a severe performance limitation in the entire network.

SUMMARY

The present disclosure provides a multicast group establishment method in a fat-tree network, an apparatus, and a fat-tree network, so as to resolve a prior-art problem of a single point failure and a severe performance limitation in an entire network.

A first aspect of the present disclosure provides a multicast group establishment method in a fat-tree network, where the fat-tree network includes N layers, the fat-tree network includes multiple switching nodes, a top layer is a core switching node, and each core switching node manages multiple multicast group addresses assigned by a management device of the fat-tree network; and the method includes:

sending, by a network node according to an address of a target multicast group, a join request to a management switching node of the target multicast group, where the join request is used to request to make the network node join the target multicast group, to establish the target multicast group, and the management switching node of the target multicast group is a core switching node to which the address of the target multicast group belongs, where the join request is self-routed from a bottom-layer switching node of the fat-tree network to the management switching node of the target multicast group in sequence according to the address of the target multicast group.

With reference to the first aspect, in a first possible implementation of the first aspect, the method further includes:

sending, by the network node, a quit request to the management switching node of the target multicast group according to the address of the target multicast group, where the quit request is used to request to make the network node quit the target multicast group, where the quit request is self-routed from the bottom-layer switching node of the fat-tree network to the management switching node of the target multicast group in sequence according to the address of the target multicast group.

With reference to the first aspect, in a second possible implementation of the first aspect, after the target multicast group is established, the method further includes:

sending, by the network node, data to the target multicast group, where the data is self-routed from the bottom-layer switching node of the fat-tree network to the management switching node of the target multicast group in sequence according to the address of the target multicast group, and forwarded from the management switching node of the target multicast group to the target multicast group.

With reference to the first aspect, in a third possible implementation of the first aspect, an address of the switching node in the fat-tree network further includes an element a, an element b, and an element c; and when c is not equal to 0, a indicates that the switching node belongs to a pod a, and b indicates that the switching node is in a column b+1 in the pod a, where c indicates that the switching node is on a layer N-c of the fat-tree network, and $c \in \{0, 1, \ldots, N-1\}$.

With reference to any one of the first aspect to the third possible implementation of the first aspect, in a fourth possible implementation of the first aspect, the multicast group address includes N elements, and an address of the network node includes N elements.

With reference to the fourth possible implementation of the first aspect, in a fifth possible implementation of the first aspect, when N=3, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

A second aspect of the present disclosure provides a multicast group establishment method in a fat-tree network, where the fat-tree network includes N layers, the fat-tree network includes multiple switching nodes, a top layer is a core switching node, and each core switching node manages multiple multicast group addresses assigned by a management device of the fat-tree network; and the method includes:

receiving, by the core switching node, a join request sent by a network node according to an address of a target multicast group, where the join request is used to request to make the network node join the target multicast group, to establish the target multicast group, and the address of the target multicast group is managed by the core switching node, where the join request is self-routed from a bottom-layer switching node of the fat-tree network to a management switching node of the target multicast group in sequence according to the address of the target multicast group.

With reference to the second aspect, in a first possible implementation of the second aspect, the method further includes:

receiving, by the core switching node, a quit request sent by the network node according to the address of the target multicast group, where the quit request is used to request to make the network node quit the target multicast group, where the quit request is self-routed from the bottom-layer switching node of the fat-tree network to the management switching node of the target multicast group in sequence according to the address of the target multicast group.

With reference to the second aspect, in a second possible implementation of the second aspect, after the target multicast group is established, the method further includes:

receiving, by the core switching node, data sent by the network node to the target multicast group, where the data is self-routed from the bottom-layer switching node of the fat-tree network to the core switching node in sequence according to the address of the target multicast group; and forwarding, by the core switching node, the data to the target multicast group according to a related entry that corresponds to the address of the target multicast group and that is in a forwarding table.

With reference to the second aspect, in a third possible implementation of the second aspect, an address of the switching node in the fat-tree network further includes an element a, an element b, and an element c; and when c is not equal to 0, a indicates that the switching node belongs to a pod a, and b indicates that the switching node is in a column b+1 in the pod a, where c indicates that the switching node is on a layer N-c of the fat-tree network, and $c \in \{0, 1, \ldots, N-1\}$.

With reference to any one of the second aspect to the third possible implementation of the second aspect, in a fourth possible implementation of the second aspect, the multicast group address includes N elements, and an address of the network node includes N elements.

With reference to any one of the fourth possible implementation of the second aspect, in a fifth possible implementation of the second aspect, when N=3, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

A third aspect of the present disclosure provides a network node, where a fat-tree network includes N layers, the fat-tree network includes multiple switching nodes, a top layer is a core switching node, and each core switching node manages multiple multicast group addresses assigned by a management device of the fat-tree network; and the network node includes:

a sending module, configured to send, according to an address of a target multicast group, a join request to a management switching node of the target multicast group, where the join request is used to request to make the network node join the target multicast group, to establish the target multicast group, and the management switching node of the target multicast group is a core switching node to which the address of the target multicast group belongs, where the join request is self-routed from a bottom-layer switching node of the fat-tree network to the management switching node of the target multicast group in sequence according to the address of the target multicast group.

With reference to the third aspect, in a first possible implementation of the third aspect, the sending module is further configured to send a quit request to the management switching node of the target multicast group according to the address of the target multicast group, where the quit request is used to request to make the network node quit the target multicast group, where the quit request is self-routed from the bottom-layer switching node of the fat-tree network to the management switching node of the target multicast group in sequence according to the address of the target multicast group.

With reference to the third aspect, in a second possible implementation of the third aspect, the sending module is further configured to send data to the target multicast group, where the data is self-routed from the bottom-layer switching node of the fat-tree network to the management switching node of the target multicast group in sequence according to the address of the target multicast group, and forwarded from the management switching node of the target multicast group to the target multicast group.

With reference to the third aspect, in a third possible implementation of the third aspect, an address of the switching node in the fat-tree network further includes an element a, an element b, and an element c; and when c is not equal to 0, a indicates that the switching node belongs to a pod a, and b indicates that the switching node is in a column b+1 in the pod a, where c indicates that the switching node is on a layer N-c of the fat-tree network, and $c \in \{0, 1, \ldots, N-1\}$.

With reference to the third aspect or the third possible implementation of the third aspect, in a fourth possible implementation of the third aspect, the multicast group address includes N elements, and an address of the network node includes N elements.

With reference to the fourth possible implementation of the third aspect, in a fifth possible implementation of the third aspect, when N=3, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

A fourth aspect of the present disclosure provides a core switching node, where a fat-tree network includes N layers, the fat-tree network includes multiple switching nodes, a top layer is the core switching node, and each core switching node manages multiple multicast group addresses assigned by a management device of the fat-tree network; and the core switching node includes:

a receiving module, configured to receive a join request sent by a network node according to an address of a target multicast group, where the join request is used to request to make the network node join the target multicast group, to establish the target multicast group, and the address of the target multicast group is managed by the core switching node, where the join request is self-routed from a bottom-layer switching node of the fat-tree network to a management switching node of the target multicast group in sequence according to the address of the target multicast group.

With reference to the fourth aspect, in a first possible implementation of the fourth aspect, the receiving module is further configured to receive a quit request sent by the network node according to the address of the target multicast group, where the quit request is used to request to make the network node quit the target multicast group, where the quit request is self-routed from the bottom-layer switching node of the fat-tree network to the management switching node of the target multicast group in sequence according to the address of the target multicast group.

With reference to the fourth aspect, in a second possible implementation of the fourth aspect, the core switching node further includes: a sending module, where the receiving module is further configured to receive, by the core switching node, data sent by the network node to the target multicast group, where the data is self-routed from the bottom-layer switching node of the fat-tree network to the core switching node in sequence according to the address of the target multicast group; and the sending module is configured to forward the data to the target multicast group according to a related entry that is of the address of the target multicast group and that is in a forwarding table.

With reference to the fourth aspect, in a third possible implementation of the fourth aspect, an address of the switching node in the fat-tree network further includes an element a, an element b, and an element c; and when c is not equal to 0, a indicates that the switching node belongs to a pod a, and b indicates that the switching node is in a column b+1 in the pod a, where c indicates that the switching node is on a layer N-c of the fat-tree network, and $c \in \{0, 1, \ldots, N-1\}$.

With reference to any one of the fourth aspect to the third possible implementation of the fourth aspect, in a fourth possible implementation of the fourth aspect, the multicast group address includes N elements, and an address of the network node includes N elements.

With reference to the fourth possible implementation of the fourth aspect, in a fifth possible implementation of the fourth aspect, when N=3, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

A fifth aspect of the embodiments of the present disclosure provides a fat-tree network, including multiple switching nodes, and being divided into N layers, where a top layer of the fat-tree network is a core switching node, and each core switching node manages multiple multicast group addresses assigned by a management device of the fat-tree network.

With reference to the fifth aspect, in a first possible implementation of the fifth aspect, the multicast group address includes N elements.

With reference to the first possible implementation of the fifth aspect, in a second possible implementation of the fifth aspect, when N=3, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

In the multicast group establishment method in a fat-tree network, the apparatus, and the fat-tree network provided in the present disclosure, a management device of the fat-tree network assigns multiple multicast group addresses to each core switching node, that is, each core switching node needs to manage only these multicast groups addresses assigned to the core switching node, that is, performing distributed management. When needing to join a multicast group, a network device needs to send only a join request to a corresponding core switching node, thereby implementing load shunting, and avoiding impact of a single point failure on the entire network; in addition, because the join request may be self-routed from a bottom layer to a top layer in sequence under guidance of an address of a target multicast group, complexity is low and is easy to implement, and multicast efficiency of the entire network is improved.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
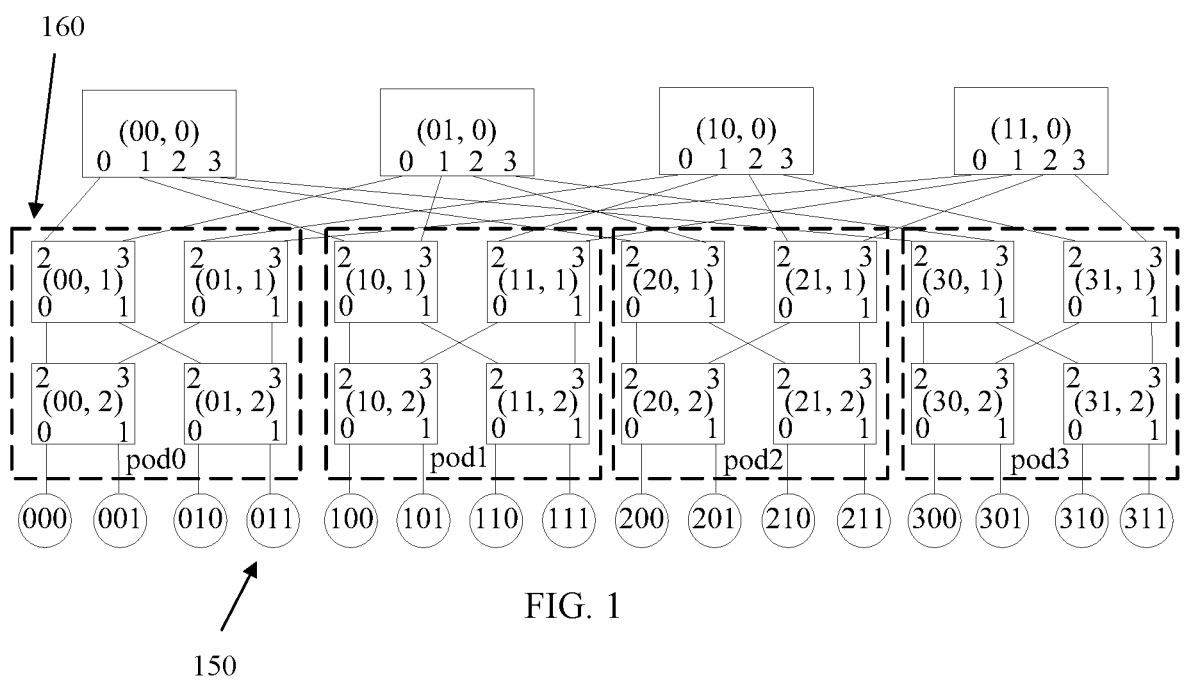
FIG. 1 is a schematic structural diagram of a fat-tree network according to the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

A network node mentioned in the embodiments of the present disclosure may be a processor or a server, but is not limited thereto. "%" represents a modulus operation.

An embodiment of the present disclosure provides a multicast group establishment method in a fat-tree network. Specifically, the fat-tree network includes N layers, the fat-tree network includes multiple switching nodes, a top layer is a core node, and each core switching node manages multiple multicast group addresses assigned by a management device of the fat-tree network.

The management device of the fat-tree network may assign the multiple multicast group addresses to each core switching node by using a routing algorithm, and each core switching node needs to manage only these multicast groups assigned to the core switching node, that is, performing distributed management, thereby implementing load shunting, and reducing workload of each core switching node.

To establish a multicast group, the management device of the fat-tree network may preset which network node needs to join the multicast group. After a target multicast group for joining is initialized, a network node going to join may actively send a join request.

Specifically, the network node sends the join request to a management switching node of the target multicast group according to an address of the target multicast group, where the join request is used to request to make the network node join the target multicast group, to establish the target multicast group.

The management switching node of the target multicast group is a core management node to which the address of the target multicast group belongs. The management switching node of the target multicast group is further responsible for completing replication of the data when a network node sends data to the target multicast group subsequently.

In this embodiment, the join request is self-routed from a bottom-layer switching node of the fat-tree network to the management switching node of the target multicast group in sequence according to the address of the target multicast group.

Specifically, elements in the address of the target multicast group may separately guide different information, some elements guide a location of a connected switching node, and some elements guide a port number. Under guidance of the address of the target multicast group, the join request may be self-routed layer by layer to the management switching node of the target multicast group at the top layer along a guided path, to complete joining the target multicast group.

Specifically, in a process in which the join request goes upward along the guided path, each time the join request passes through one switching node, the switching node determines whether a forwarding table of the switching node includes the address of the target multicast group; if the forwarding table of the switching node includes the address of the target multicast group, the switching node adds a port receiving the join request as a destination port to the forwarding table, and the network node successfully joins the target multicast group; or if the forwarding table of the switching node does not include the address of the target multicast group, the switching node firstly writes the address of the target multicast group into the forwarding table, and during writing, adds a port receiving the join request as a destination port to the forwarding table. Then, the join request continues to be self-routed to an upper-layer switching node. It should be noted that after the join request reaches the core switching node, the core switching node also determines whether a forwarding table of the core switching node includes the address of the target multicast group; if the forwarding table of the core switching node includes the address of the target multicast group, the switching node adds a port receiving the join request as a destination port to the forwarding table, and the network node successfully joins the target multicast group; or if the forwarding table of the switching node does not include the address of the target multicast group, the switching node firstly writes the address of the target multicast group into the forwarding table, and during writing, adds a port receiving the join request as a destination port to the forwarding table. A difference is that because the core switching node is a top-layer switching node, the join request is no longer forwarded upward.

In this embodiment, a management device of a fat-tree network assigns multiple multicast group addresses to each core switching node, that is, each core switching node needs to manage only these multicast groups assigned to the core switching node, that is, performing distributed management. When needing to join a multicast group, a network device needs to send only a join request to a corresponding core switching node, thereby implementing load shunting, and avoiding impact of a single point failure on the entire network; in addition, because the join request may be self-routed from a bottom layer to a top layer in sequence under guidance of an address of a target multicast group, complexity is low and is easy to implement, and multicast efficiency of the entire network is improved.

Further, if a network node needs to disengage the target multicast group, similar to the foregoing join procedure, a procedure is also very easy to implement. Specifically, the network node sends a quit request to the management switching node of the target multicast group according to the address of the target multicast group, where the quit request is used to make the network node quit the target multicast group. Similarly, the quit request is self-routed from the bottom-layer switching node of the fat-tree network to the management switching node of the target multicast group in sequence according to the address of the target multicast group.

Specifically, in a self-routing process of the quit request, a switching node that is passed through may determine whether a forwarding table of the switching node includes the address of the target multicast group; if the forwarding table of the switching node includes the address of the target multicast group, the switching node deletes a destination port from a related record of the address of the target multicast group, that is, delete a port receiving the quit request; after the deletion, the switching node checks whether the related record of the address of the target multicast group further includes another port; if the related record of the address of the target multicast group further includes another port, the network node successfully disengages from the target multicast group; or if the related record of the address of the target multicast group does not include another port, the switching node totally deletes a whole record corresponding to the address of the target multicast group in the forwarding table. Then, the quit request is self-routed to an upper-layer switching node. Certainly, if the quit request is at a core switching node, the quit request does not need to be self-routed to the upper layer.

Further, after the multicast group is established, any network node in the network may send data to the multicast group, and a data sending procedure is similar to the foregoing procedures of the join request and the quit request. Specifically, a network node sends data to the target multicast group, where the data may be self-routed from the bottom-layer switching node of the fat-tree network to the management switching node of the target multicast group in sequence according to the address of the target multicast group, and forwarded from the management switching node of the target multicast group to the target multicast group.

Specifically, in a process of routing the data upward to the management switching node of the target multicast group, there is no need to perform data replication. After the data reaches the management switching node, the management switching node views, according to a related entry that is of the address of the target multicast group and that is recorded in a forwarding table, related ports corresponding to the address of the target multicast group, and replicates the data to the several ports. The data may reach a corresponding lower-layer switching node from the several ports. The lower-layer switching node performs an action same as that of the management switching node, the action is performed in sequence until the data reaches all network nodes in the target multicast group, and data transmission is completed. In an entire data transmission process, only the management switching node corresponding to the target multicast group needs to participate in management, the data transmission is completed along a particular path, and there is no need to consider other information of the entire network. The process is simple and fast, and impact of a single point failure on the data transmission is avoided.

Correspondingly, an address of the switching node in the fat-tree network includes an element a, an element b, and an element c, where c indicates that the switching node is on a layer N-c in the fat-tree network, and $c \in \{0, 1, \ldots, N-1\}$. In this way, a layer, in the network, at which the switching node falls may be known according to the address of the switching node in a self-routing process of the join request or the data.

Specifically, the address of the switching node may be represented as (a, b, c). When c=0, it indicates that the switching node is a top-layer switch. In this case, the element a and the element b have no actual meaning, but only serve as a common binary symbol. When c is not equal to 0, a indicates that the switching node belongs to a pod a, and b indicates that the switching node is in a column b+1 in the pod a. Correspondingly, the data or the request sent by the network node may find a corresponding pod number and port number according to guidance of the address of the target multicast group, to complete self-routing upward.

Further, the multicast group address includes N elements, that is, the same as a quantity of layers of the fat-tree network. The N elements respectively guide the data to be self-routed from the bottom-layer switching node of the fat-tree network to the management switching node of the target multicast group in sequence. Similarly, the network node needs to send only the join request and the quit request, and then, the join request and the quit request may be self-routed from the bottom-layer switching node of the fat-tree network to the management switching node of the target multicast group in sequence according to the address of the target multicast group.

Similarly, in the fat-tree network, an address of the network node also includes N elements. In this way, when a network node sends a unicast message to another destination network node, the unicast message may be self-routed from the bottom-layer switching node of the fat-tree network to the top-layer core switching node in sequence under guidance of an address of the destination network node, and then forwarded from the core switching node to the destination network node.

Commonly, the fat-tree network includes three layers, that is, N=3. In this case, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

It is assumed that the address of the network node includes three elements: i, j, and k, i indicates that the network node belongs to a pod i, j indicates that the network node is connected to an access switching node in a $(j+1)^{th}$ column in the pod i, and k indicates that the network node is connected to a $(k+1)^{th}$ port of the access switching node in the $(j+1)^{th}$ column in the pod i. The address of the network node and the multicast group address may both be marked as (i, j, k). When j>n or k>n, (i, j, k) is the multicast group address; otherwise, (i, j, k) is the address of the network node.

FIG. 1 is a schematic structural diagram of a fat-tree network according to the present disclosure. As shown in FIG. 1, the fat-tree network includes three layers. A circle 150 at a lowest layer in FIG. 1 represents a network node, three layers upward in sequence are an access switching node, an aggregation switching node, and a core switching node, and each dotted box 160 represents a pod. In this example, n=2.

For the three elements i, j, and k in the address of the network node, each element occupies log 2n bits.

Figure 2:
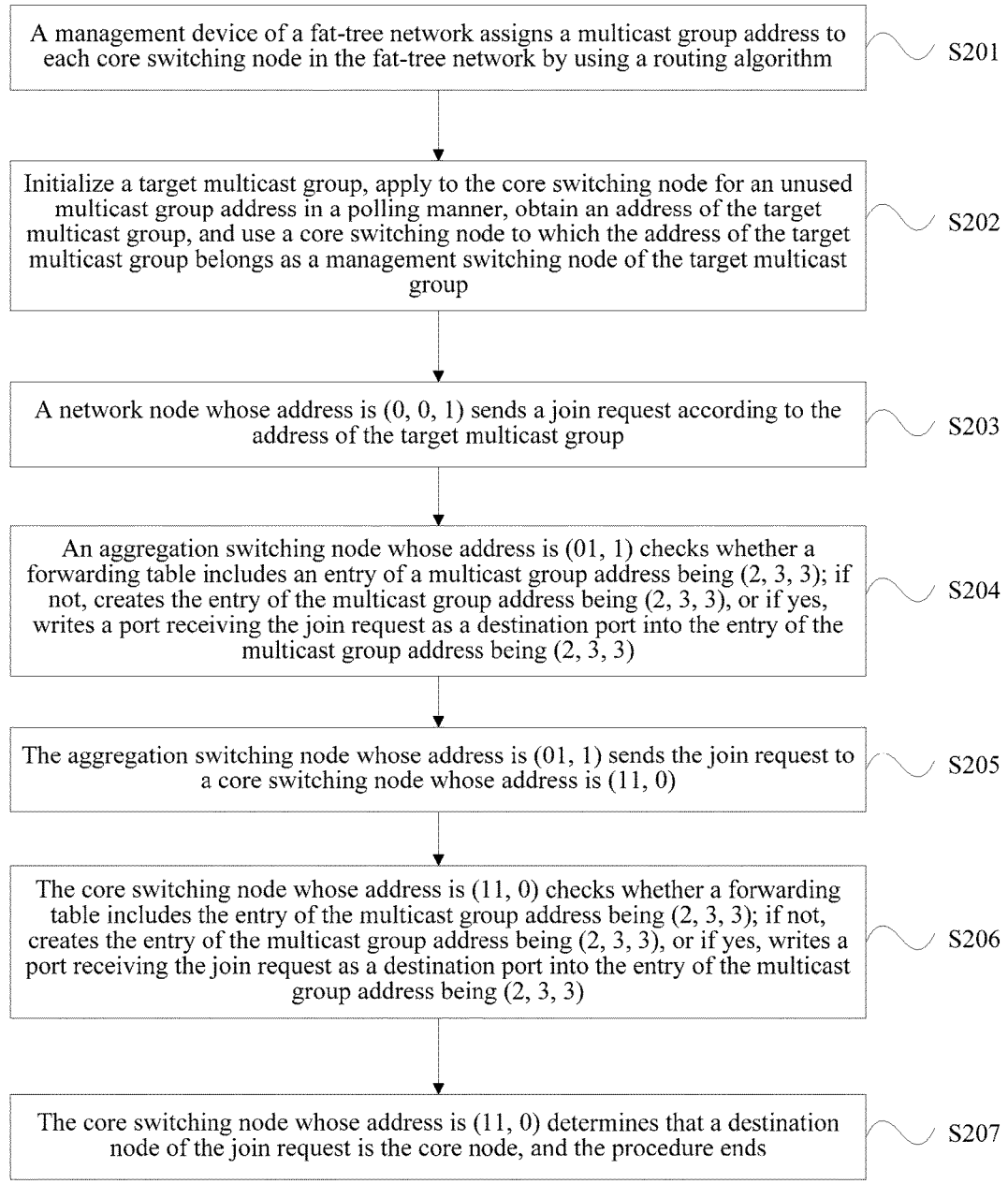
FIG. 2 is a schematic flowchart of Embodiment 1 of a multicast group establishment method in a fat-tree network according to the present disclosure.

FIG. 2 is a schematic flowchart of Embodiment 1 of a multicast group establishment method in a fat-tree network according to the present disclosure. As shown in FIG. 2, using the fat-tree network shown in FIG. 1 as an example, the method includes the following steps.

S201: A management device of a fat-tree network assigns a multicast group address to each core switching node in the fat-tree network by using a routing algorithm.

Assuming that the multicast group address is (h, m, u), by using the routing algorithm, u % n corresponds to a highest digit of an address of the core switching node, m % n corresponds to a second digit of the address of the core switching node, and a third digit of the core switching node is always the same. For example, for a multicast group address (2, 3, 3), u % n=3%2=1, and m % n=3%2=1. Therefore, the multicast group address (2, 3, 3) is assigned to a core switching node whose address is (11, 0). After assignment is performed by using such an algorithm, quantity of the multicast group address assigned to each core switching node is basically the same, so as to ensure load shunting.

S202: Initialize a target multicast group, apply to the core switching node for an unused multicast group address in a polling manner, obtain an address of the target multicast group, and use a core switching node to which the address of the target multicast group belongs as a management switching node of the target multicast group.

For example, a multicast group address (2, 3, 3) is obtained as the address of the target multicast group from a core switching node whose address is (11, 0).

The following describes a process in which a network node joins the target multicast group by using a network node whose address is (0, 0, 1) as an example.

S203: A network node whose address is (0, 0, 1) sends a join request according to the address of the target multicast group. That is, the network node belongs to a pod( ), and is connected to an access switching node in a first column in the pod( ). Referring to FIG. 2, the join request reaches an access switch whose address is (00, 2); the access switch checks whether a forwarding table includes an entry of a multicast group address being (2, 3, 3); if not, creates the entry of the multicast group address being (2, 3, 3); or if yes, writes a port receiving the join request as a destination port into the entry of the multicast group address being (2, 3, 3).

Then, according to u=3 in the address of the target multicast group, the join request is sent from a port 3 of the access switching node whose address is (00, 2) to an aggregation switching node whose address is (01, 1).

S204: An aggregation switching node whose address is (01, 1) checks whether a forwarding table includes the entry of the multicast group address being (2, 3, 3); if not, creates the entry of the multicast group address being (2, 3, 3), or if yes, writes a port receiving the join request as a destination port into the entry of the multicast group address being (2, 3, 3).

S205: The aggregation switching node whose address is (01, 1) sends the join request to a core switching node whose address is (11, 0).

Specifically, the aggregation switching node whose address is (01, 1) may send, according to m=3 in the address of the target multicast group, the join request from a port 3 of the aggregation switching node to the core switching node whose address is (11, 0).

S206: The core switching node whose address is (11, 0) checks whether a forwarding table includes the entry of the multicast group address being (2, 3, 3); if not, creates the entry of the multicast group address being (2, 3, 3), or if yes, writes a port receiving the join request as a destination port into the entry of the multicast group address being (2, 3, 3).

In addition, the core switching node whose address is (11, 0) checks whether the aggregation switching node whose address is (01, 1) exists in the forwarding table; if the aggregation switching node whose address is (01, 1) does not exist in the forwarding table, adds a switching node whose address is (01, 1).

S207: The core switching node whose address is (11, 0) determines that a destination node of the join request is the core node, and the procedure ends.

When another network node joins a multicast group, refer to the foregoing procedure.

Based on the foregoing embodiment, an embodiment of the present disclosure further provides a multicast group establishment method in a fat-tree network, and the method is executed by the foregoing core switching node. A based-on scenario similarly is: a fat-tree network includes N layers, the fat-tree network includes multiple switching nodes, a top layer is a core switching node, and each core switching node manages multiple multicast group addresses assigned by a management device of the fat-tree network.

Corresponding to the foregoing method, the method includes: receiving, by the core switching node, a join request sent by the network node according to an address of a target multicast group, where the join request is used to make the network node join the target multicast group, to establish the target multicast group.

Specifically, the join request is self-routed from a bottom-layer switching node of the fat-tree network to a management switching node of the target multicast group in sequence according to the address of the target multicast group.

The address of the target multicast group is managed by the core switching node.

Specifically, for a self-routing method of the join request, refer to the foregoing embodiment, and details are not described herein again.

After the join request reaches the core switching node, the core switching node firstly determines whether a forwarding table of the core switching node includes the address of the target multicast group; if the forwarding table of the core switching node includes the address of the target multicast group, the core switching node adds a port receiving the join request as a destination port to the forwarding table, and the network node successfully joins the target multicast group; or if the forwarding table of the core switching node does not include the address of the target multicast group, the core switching node writes the address of the target multicast group into the forwarding table, and during writing, adds a port receiving the join request as a destination port to the forwarding table.

In this embodiment, a management device of a fat-tree network assigns multiple multicast group addresses to each core switching node, that is, each core switching node needs to manage only these multicast groups assigned to the core switching node, that is, performing distributed management. When needing to join a multicast group, a network device needs to send only a join request to a corresponding core switching node, thereby implementing load shunting, and avoiding impact of a single point failure on the entire network; in addition, because the join request may be self-routed from a bottom layer to a top layer in sequence under guidance of an address of a target multicast group, complexity is low and is easy to implement, and multicast efficiency of the entire network is improved.

Correspondingly, when a network node needs to disengage the target multicast group, the core switching node receives a quit request sent by the network node according to the address of the target multicast group, where the quit request is used to request to make the network node quit the target multicast group. The quit request is self-routed from the bottom-layer switching node of the fat-tree network to the management switching node of the target multicast group in sequence according to the address of the target multicast group.

Correspondingly, after the target multicast group is established, the network node may send data to the target multicast group. The data passes through the management switching node corresponding to the target multicast group, and is forwarded by the management switching node, so as to implement distributed management and load shunting. Specifically, the core switching node receives data sent by the network node to the target multicast group, where the data is self-routed from the bottom-layer switching node of the fat-tree network to the core switching node in sequence according to the address of the target multicast group. Then, the core switching node forwards the data to the target multicast group according to a related entry that corresponds to the address of the target multicast group and that is in a forwarding table.

Further, an address of the switching node in the fat-tree network includes an element a, an element b, and an element c, where c indicates that the switching node is on a layer N-c in the fat-tree network, and $c \in \{0, 1, \ldots, N-1\}$.

Specifically, the address of the switching node may be represented as (a, b, c). When c=0, it indicates that the switching node is a top-layer switch. In this case, the element a and the element b have no actual meaning, but only serve as a common binary symbol. When c is not equal to 0, a indicates that the switching node belongs to a pod a, and b indicates that the switching node is in a column b+1 in the pod a. Correspondingly, the data or the request sent by the network node may find a corresponding pod number and port number according to guidance of the address of the target multicast group, to complete self-routing upward.

Further, the multicast group address includes N elements, that is, the same as a quantity of layers of the fat-tree network. The N elements respectively guide the data to be self-routed from the bottom-layer switching node of the fat-tree network to the management switching node of the target multicast group in sequence. Similarly, the network node needs to send only the join request and the quit request, and then, the join request and the quit request may be the self-routed from the bottom-layer switching node of the fat-tree network to the management switching node of the target multicast group in sequence according to the address of the target multicast group.

Similarly, in the fat-tree network, an address of the network node also includes N elements. In this way, when a network node sends a unicast message to another destination network node, the unicast message may be self-routed from the bottom-layer switching node of the fat-tree network to the top-layer core switching node in sequence under guidance of an address of the destination network node, and then forwarded from the core switching node to the destination network node.

Commonly, the fat-tree network includes three layers, that is, N=3. In this case, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

It is assumed that the address of the network node includes three elements: i, j, and k, i indicates that the network node belongs to a pod i, j indicates that the network node is connected to an access switching node in a $(j+1)^{th}$ column in the pod i, and k indicates that the network node is connected to a $(k+1)^{th}$ port of the access switching node in the $(j+1)^{th}$ column in the pod i. The address of the network node and the multicast group address may both be marked as (i, j, k). When j>n or k>n, (i, j, k) is the multicast group address; otherwise, (i, j, k) is the address of the network node.

An embodiment of the present disclosure provides a network node, where the network node is a network node in a fat-tree network. Specifically, the fat-tree network includes multiple switching nodes, a top layer is a core switching node, and each core switching node manages multiple multicast group addresses assigned by a management device of the fat-tree network.

The network node includes: a sending module, configured to send, according to an address of a target multicast group, a join request to a management switching node of the target multicast group, where the join request is used to request to make the network node join the target multicast group, to establish the target multicast group, and the management switching node of the target multicast group is a core switching node to which the address of the target multicast group belongs, where the join request is self-routed from a bottom-layer switching node of the fat-tree network to the management switching node of the target multicast group in sequence according to the address of the target multicast group.

In this embodiment, a management device of a fat-tree network assigns multiple multicast group addresses to each core switching node, that is, each core switching node needs to manage only these multicast groups assigned to the core switching node, that is, performing distributed management. When needing to join a multicast group, a network device needs to send only a join request to a corresponding core switching node, thereby implementing load shunting, and avoiding impact of a single point failure on the entire network; in addition, because the join request may be self-routed from a bottom layer to a top layer in sequence under guidance of an address of a target multicast group, complexity is low and is easy to implement, and multicast efficiency of the entire network is improved.

In another embodiment, the sending module is configured to send a quit request to the management switching node of the target multicast group according to the address of the target multicast group, where the quit request is used to request to make the network node quit the target multicast group, where the quit request is self-routed from the bottom-layer switching node of the fat-tree network to the management switching node of the target multicast group in sequence according to the address of the target multicast group.

In another embodiment, the sending module is configured to send data to the target multicast group, where the data is self-routed from the bottom-layer switching node of the fat-tree network to the management switching node of the target multicast group in sequence according to the address of the target multicast group, and forwarded from the management switching node of the target multicast group to the target multicast group.

An address of the switching node in the fat-tree network further includes an element a, an element b, and an element c; and when c is not equal to 0, a indicates that the switching node belongs to a pod a, and b indicates that the switching node is in a column b+1 in the pod a.

Specifically, the address of the switching node may be represented as (a, b, c). When c=0, it indicates that the switching node is a top-layer switch. In this case, the element a and the element b have no actual meaning, but only serve as a common binary symbol. When c is not equal to 0, a indicates that the switching node belongs to a pod a, and b indicates that the switching node is in a column b+1 in the pod a. Correspondingly, the data or the request sent by the network node may find a corresponding pod number and port number according to guidance of the address of the target multicast group, to complete self-routing upwards.

c indicates that the switching node is on a layer N-c of the fat-tree network, and $c \in \{0, 1, \ldots, N-1\}$.

The multicast group address includes N elements, and an address of the network node includes N elements.

When N=3, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

The network node is configured to execute the foregoing method embodiment, implementation principles and technical effects are similar, and details are not described herein again.

Figure 3:
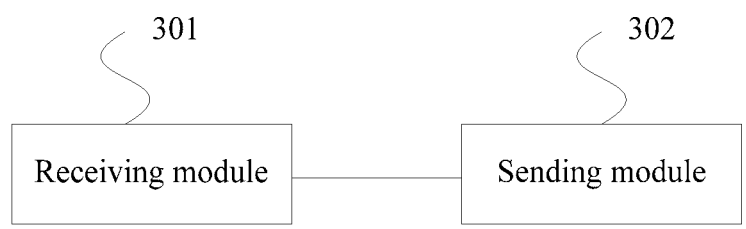
FIG. 3 is a schematic structural diagram of Embodiment 1 of a core switching node according to the present disclosure.

FIG. 3 is a schematic structural diagram of Embodiment 1 of a core switching node according to the present disclosure. The core switching node is a core switching node in a fat-tree network. Specifically, the fat-tree network includes multiple switching nodes, a top layer is the core switching node, and each core switching node manages multiple multicast group addresses assigned by a management device of the fat-tree network.

Referring to FIG. 3, the core switching node includes a receiving module 301, configured to receive a join request sent by a network node according to an address of a target multicast group, where the join request is used to request to make the network node join the target multicast group, to establish the target multicast group, and the address of the target multicast group is managed by the core switching node.

The join request is self-routed from a bottom-layer switching node of the fat-tree network to a management switching node of the target multicast group in sequence according to the address of the target multicast group.

In this embodiment, a management device of a fat-tree network assigns multiple multicast group addresses to each core switching node, that is, each core switching node needs to manage only these multicast groups assigned to the core switching node, that is, performing distributed management. When needing to join a multicast group, a network device needs to send only a join request to a corresponding core switching node, thereby implementing load shunting, and avoiding impact of a single point failure on the entire network; in addition, because the join request may be self-routed from a bottom layer to a top layer in sequence under guidance of an address of a target multicast group, complexity is low and is easy to implement, and multicast efficiency of the entire network is improved.

In another embodiment, the receiving module 301 is further configured to receive a quit request sent by the network node according to the address of the target multicast group, where the quit request is used to request to make the network node quit the target multicast group. The quit request is self-routed from the bottom-layer switching node of the fat-tree network to the management switching node of the target multicast group in sequence according to the address of the target multicast group.

In another embodiment, referring to FIG. 3, the core switching node further includes: a sending module 302.

Specifically, the receiving module 301 is configured to receive, by the core switching node, data sent by the network node to the target multicast group, where the data is self-routed from the bottom-layer switching node of the fat-tree network to the core switching node in sequence according to the address of the target multicast group.

The sending module 302 is configured to forward the data to the target multicast group according to a related entry that is of the address of the target multicast group and that is in a forwarding table.

An address of the switching node in the fat-tree network further includes an element a, an element b, and an element c; and when c is not equal to 0, a indicates that the switching node belongs to a pod a, and b indicates that the switching node is in a column b+1 in the pod a.

c indicates that the switching node is on a layer N-c of the fat-tree network, and $c \in \{0, 1, \ldots, N-1\}$.

The multicast group address includes N elements, and an address of the network node includes N elements.

When N=3, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

The core switching node is configured to execute the foregoing method embodiment, implementation principles and technical effects are similar, and details are not described herein again.

An embodiment of the present disclosure further provides a fat-tree network. The fat-tree network includes multiple switching nodes, and is divided into N layers. A top layer of the fat-tree network is a core switching node, and each core switching node manages multiple multicast group addresses assigned by a management device of the fat-tree network.

In the fat-tree network of this embodiment, each core switching node manages the multiple multicast addresses assigned by the management device of the fat-tree network, that is, performing distributed management, thereby implementing load shunting, and avoiding impact of a single point failure on the entire network; in addition, because a join request is self-routed from a bottom layer to a top layer in sequence under guidance of an address of a target multicast group, complexity is low and is easy to implement, and multicast efficiency of the entire network is improved.

Specifically, the multicast group address includes N elements, that is, the same as a quantity of layers of the fat-tree network. The N elements respectively guide data to be self-routed from a bottom-layer switching node of the fat-tree network to a management switching node of the target multicast group in sequence. Similarly, the network node needs to send only the join request and the quit request, and then, the join request and the quit request may be self-routed from the bottom-layer switching node of the fat-tree network to the management switching node of the target multicast group in sequence according to the address of the target multicast group.

When N=3, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

Specifically, for a three-layer fat-tree network, refer to FIG. 1, but the three-layer fat-tree network is not limited thereto.

An embodiment of the present disclosure further provides a network node, where the network node is a network node in a fat-tree network. Specifically, the fat-tree network includes multiple switching nodes, a top layer is a core switching node, and each core switching node manages multiple multicast group addresses assigned by a management device of the fat-tree network.

The network node includes: a transmitter, configured to send, according to an address of a target multicast group, a join request to a management switching node of the target multicast group, where the join request is used to request to make the network node join the target multicast group, to establish the target multicast group, and the management switching node of the target multicast group is a core switching node to which the address of the target multicast group belongs, where the join request is self-routed from a bottom-layer switching node of the fat-tree network to the management switching node of the target multicast group in sequence according to the address of the target multicast group.

In this embodiment, a management device of a fat-tree network assigns multiple multicast group addresses to each core switching node, that is, each core switching node needs to manage only these multicast groups assigned to the core switching node, that is, performing distributed management. When needing to join a multicast group, a network device needs to send only a join request to a corresponding core switching node, thereby implementing load shunting, and avoiding impact of a single point failure on the entire network; in addition, because the join request may be self-routed from a bottom layer to a top layer in sequence under guidance of an address of a target multicast group, complexity is low and is easy to implement, and multicast efficiency of the entire network is improved.

In another embodiment, the transmitter is configured to send a quit request to the management switching node of the target multicast group according to the address of the target multicast group, where the quit request is used to request to make the network node quit the target multicast group, where the quit request is self-routed from the bottom-layer switching node of the fat-tree network to the management switching node of the target multicast group in sequence according to the address of the target multicast group.

In another embodiment, the transmitter is configured to send data to the target multicast group, where the data is self-routed from the bottom-layer switching node of the fat-tree network to the management switching node of the target multicast group in sequence according to the address of the target multicast group, and forwarded from the management switching node of the target multicast group to the target multicast group.

An address of the switching node in the fat-tree network further includes an element a, an element b, and an element c; and when c is not equal to 0, a indicates that the switching node belongs to a pod a, and b indicates that the switching node is in a column b+1 in the pod a.

c indicates that the switching node is on a layer N-c of the fat-tree network, and $c \in \{0, 1, \ldots, N-1\}$.

The multicast group address includes N elements, and an address of the network node includes N elements.

When N=3, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

The network node is configured to execute the foregoing method embodiment, implementation principles and technical effects are similar, and details are not described herein again.

Figure 4:
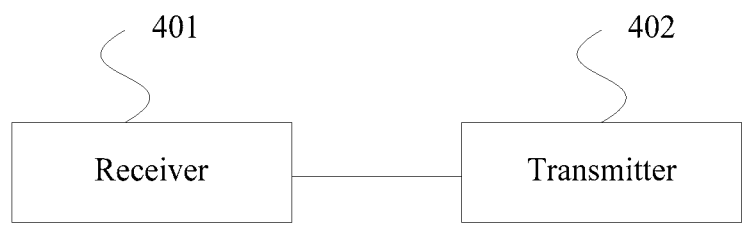
FIG. 4 is a schematic structural diagram of Embodiment 2 of a core switching node according to the present disclosure.

FIG. 4 is a schematic structural diagram of Embodiment 2 of a core switching node according to the present disclosure. The core switching node is a core switching node in a fat-tree network. Specifically, the fat-tree network includes multiple switching nodes, a top layer is the core switching node, and each core switching node manages multiple multicast group addresses assigned by a management device of the fat-tree network.

Referring to FIG. 4, the core switching node includes: a receiver 401, configured to receive a join request sent by a network node according to an address of a target multicast group, where the join request is used to request to make the network node join the target multicast group, to establish the target multicast group, and the address of the target multicast group is managed by the core switching node.

The join request is self-routed from a bottom-layer switching node of the fat-tree network to a management switching node of the target multicast group in sequence according to the address of the target multicast group.

In this embodiment, a management device of a fat-tree network assigns multiple multicast group addresses to each core switching node, that is, each core switching node needs to manage only these multicast groups assigned to the core switching node, that is, performing distributed management. When needing to join a multicast group, a network device needs to send only a join request to a corresponding core switching node, thereby implementing load shunting, and avoiding impact of a single point failure on the entire network; in addition, because the join request may be self-routed from a bottom layer to a top layer in sequence under guidance of an address of a target multicast group, complexity is low and is easy to implement, and multicast efficiency of the entire network is improved.

In another embodiment, the receiver 401 is further configured to receive a quit request sent by the network node according to the address of the target multicast group, where the quit request is used to request to make the network node quit the target multicast group. The quit request is self-routed from the bottom-layer switching node of the fat-tree network to the management switching node of the target multicast group in sequence according to the address of the target multicast group.

In another embodiment, referring to FIG. 4, the core switching node further includes: a transmitter 402.

Specifically, the receiver 401 is configured to receive, by the core switching node, data sent by the network node to the target multicast group, where the data is self-routed from the bottom-layer switching node of the fat-tree network to the core switching node in sequence according to the address of the target multicast group.

The transmitter 402 is configured to forward the data to the target multicast group according to a related entry that is of the address of the target multicast group and that is in a forwarding table.

An address of the switching node in the fat-tree network further includes an element a, an element b, and an element c; and when c is not equal to 0, a indicates that the switching node belongs to a pod a, and b indicates that the switching node is in a column b+1 in the pod a.

c indicates that the switching node is on a layer N-c of the fat-tree network, and $c \in \{0, 1, \ldots, N-1\}$.

The multicast group address includes N elements, and an address of the network node includes N elements.

When N=3, the fat-tree network includes 2n pods, each pod includes n access switching nodes and n aggregation switching nodes, the access switching nodes are on a first layer of the fat-tree network, the aggregation switching nodes are on a second layer of the fat-tree network, and the core switching node is on a third layer of the fat-tree network.

The core switching node is configured to execute the foregoing method embodiment, implementation principles and technical effects are similar, and details are not described herein again.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A multicast group establishment method, comprising:
sending, by a network node according to an address of a target multicast group, a join request to a management switching node of the target multicast group, wherein the join request is used to request to make the network node join the target multicast group, to establish the target multicast group, and the management switching node of the target multicast group is a core switching node to which the address of the target multicast group belongs,
wherein the network node resides in a fat-tree network, wherein the fat-tree network comprises N layers, and the fat-tree network comprises multiple switching nodes;
wherein the join request is self-routed from a bottom-layer switching node of the fat-tree network to the management switching node of the target multicast group in sequence according to the address of the target multicast group; and
wherein an address of a switching node in the fat-tree network further comprises an element a, an element b, and an element c; and when c is not equal to 0, a indicates that the switching node belongs to a pod a, and b indicates that the switching node is in a column b+1 in the pod a, wherein c indicates that the switching node is on a layer N-c of the fat-tree network, and $c \in \{0, 1, \ldots, N-1\}$.

2. The method according to claim 1, further comprising:
sending, by the network node, a quit request to the management switching node of the target multicast group according to the address of the target multicast group, wherein the quit request is used to request to make the network node quit the target multicast group, wherein the quit request is self-routed from the bottom-layer switching node of the fat-tree network to the management switching node of the target multicast group in sequence according to the address of the target multicast group.

3. The method according to claim 1, wherein after the target multicast group is established, the method further comprises:
sending, by the network node, data to the target multicast group, wherein the data is self-routed from the bottom-layer switching node of the fat-tree network to the management switching node of the target multicast group in sequence according to the address of the target multicast group, and forwarded from the management switching node of the target multicast group to the target multicast group.

4. The method according to claim 1, wherein the multicast group address comprises N elements, and an address of the network node comprises N elements.

5. The method according to claim 4, wherein when N=3, the fat-tree network comprises 2n pods, each pod comprises n access switching nodes and n aggregation switching nodes, the access switching nodes are on a first layer of the fat-tree network, the aggregation switching nodes are on a second layer of the fat-tree network, and the core switching node is on a third layer of the fat-tree network.

6. A multicast group establishment method, comprising:
receiving, by a core switching node, a join request sent by a network node according to an address of a target multicast group, wherein the join request is used to request to make the network node join the target multicast group, to establish the target multicast group, and the address of the target multicast group is managed by the core switching node,
wherein the core switching node resides in a fat-tree network, wherein the fat-tree network comprises N layers, and the fat-tree network comprises multiple switching nodes;
wherein the join request is self-routed from a bottom-layer switching node of the fat-tree network to a management switching node of the target multicast group in sequence according to the address of the target multicast group; and
wherein an address of a switching node in the fat-tree network further comprises an element a, an element b, and an element c; and when c is not equal to 0, a indicates that the switching node belongs to a pod a, and b indicates that the switching node is in a column b+1 in the pod a, wherein c indicates that the switching node is on a layer N-c of the fat-tree network, and $c \in \{0, 1, \ldots, N-1\}$.

7. The method according to claim 6, further comprising:
receiving, by the core switching node, a quit request sent by the network node according to the address of the target multicast group, wherein the quit request is used to request to make the network node quit the target multicast group,
wherein the quit request is self-routed from the bottom-layer switching node of the fat-tree network to the management switching node of the target multicast group in sequence according to the address of the target multicast group.

8. The method according to claim 6, wherein after the target multicast group is established, the method further comprises:
receiving, by the core switching node, data sent by the network node to the target multicast group, wherein the data is self-routed from the bottom-layer switching node of the fat-tree network to the core switching node in sequence according to the address of the target multicast group; and
forwarding, by the core switching node, the data to the target multicast group according to a related entry that corresponds to the address of the target multicast group and that is in a forwarding table.

9. The method according to claim 6, wherein the multicast group address comprises N elements, and an address of the network node comprises N elements.

10. The method according to claim 9, wherein when N=3, the fat-tree network comprises 2n pods, each pod comprises n access switching nodes and n aggregation switching nodes, the access switching nodes are on a first layer of the fat-tree network, the aggregation switching nodes are on a second layer of the fat-tree network, and the core switching node is on a third layer of the fat-tree network.

11. A network node, comprising:
a memory comprising instructions, and
one or more processors in communication with the memory, wherein the one or more processors execute instructions to:
send, according to an address of a target multicast group, a join request to a management switching node of the target multicast group, wherein the join request is used to request to make the network node join the target multicast group, to establish the target multicast group, and the management switching node of the target multicast group is a core switching node to which the address of the target multicast group belongs,
wherein the network node resides in a fat-tree network, wherein the fat-tree network comprises N layers, and the fat-tree network comprises multiple switching nodes;
wherein the join request is self-routed from a bottom-layer switching node of the fat-tree network to the management switching node of the target multicast group in sequence according to the address of the target multicast group; and
wherein an address of a switching node in the fat-tree network further comprises an element a, an element b, and an element c; and when c is not equal to 0, a indicates that the switching node belongs to a pod a, and b indicates that the switching node is in a column b+1 in the pod a, wherein c indicates that the switching node is on a layer N-c of the fat-tree network, and $c \in \{0, 1, \ldots, N-1\}$.

12. The network node according to claim 11, wherein the one or more processors further execute instructions to
send a quit request to the management switching node of the target multicast group according to the address of the target multicast group, wherein the quit request is used to request to make the network node quit the target multicast group,
wherein the quit request is self-routed from the bottom-layer switching node of the fat-tree network to the management switching node of the target multicast group in sequence according to the address of the target multicast group.

13. The network node according to claim 11, wherein the one or more processors further execute instructions to
send data to the target multicast group, wherein the data is self-routed from the bottom-layer switching node of the fat-tree network to the management switching node of the target multicast group in sequence according to the address of the target multicast group, and forwarded from the management switching node of the target multicast group to the target multicast group.

14. The network node according to claim 11, wherein the multicast group address comprises N elements, and an address of the network node comprises N elements.

15. The network node according to claim 14, wherein when N=3, the fat-tree network comprises 2n pods, each pod comprises n access switching nodes and n aggregation switching nodes, the access switching nodes are on a first layer of the fat-tree network, the aggregation switching nodes are on a second layer of the fat-tree network, and the core switching node is on a third layer of the fat-tree network.

* * * * *